United States Patent [19]

Egger et al.

[11] Patent Number: 5,645,039
[45] Date of Patent: Jul. 8, 1997

[54] WIRE CONNECTING DEVICE FOR DIAMOND WIRE SAWS

[75] Inventors: Franz Egger, Vomp; Josef Plattner, Jenbach, both of Austria

[73] Assignee: Tyrolit Schleifmittelwerke Swarovski K.G., Tirol, Austria

[21] Appl. No.: 490,022

[22] Filed: Jun. 12, 1995

[30] Foreign Application Priority Data

Jun. 13, 1994 [AT] Austria ............... GM117/94

[51] Int. Cl.⁶ .................................................... B28D 1/08
[52] U.S. Cl. .................................... 125/21; 83/651.1
[58] Field of Search ................. 125/21, 22; 83/651.1

[56] References Cited

U.S. PATENT DOCUMENTS

| | | | |
|---|---|---|---|
| 3,847,569 | 11/1974 | Snow | 125/21 X |
| 3,884,212 | 5/1975 | Armstrong et al. | 125/21 |
| 4,856,490 | 8/1989 | Kawase et al. | 125/21 |
| 4,907,564 | 3/1990 | Sowa et al. | 125/21 |
| 5,080,086 | 1/1992 | Tomlinson et al. | 125/21 |
| 5,216,999 | 6/1993 | Han | 125/21 |
| 5,377,659 | 1/1995 | Tank et al. | 125/21 |

FOREIGN PATENT DOCUMENTS 1057298  11/1983  U.S.S.R. .................... 125/21

*Primary Examiner*—Timothy V. Eley
*Attorney, Agent, or Firm*—Rankin, Hill, Lewis & Clark

[57] ABSTRACT

The invention relates to a cutting wire, with preferably metal-bonded cutting beads with diamond abrasives, and a wire connector to form a loop for use on mobile and stationary wire sawing machines. Through the invention, the life of the cutting wire connectors is considerably improved. This improvement of service life is achieved because premature wire breaks in the proximity of the connector are avoided by introducing preferably annular inserts made of an elastic mass between the main wire and the clamping sleeve of the connector before the clamping action is executed so that after clamping an elastic, pre-stressed, vibration-dampening zone is created.

8 Claims, 3 Drawing Sheets

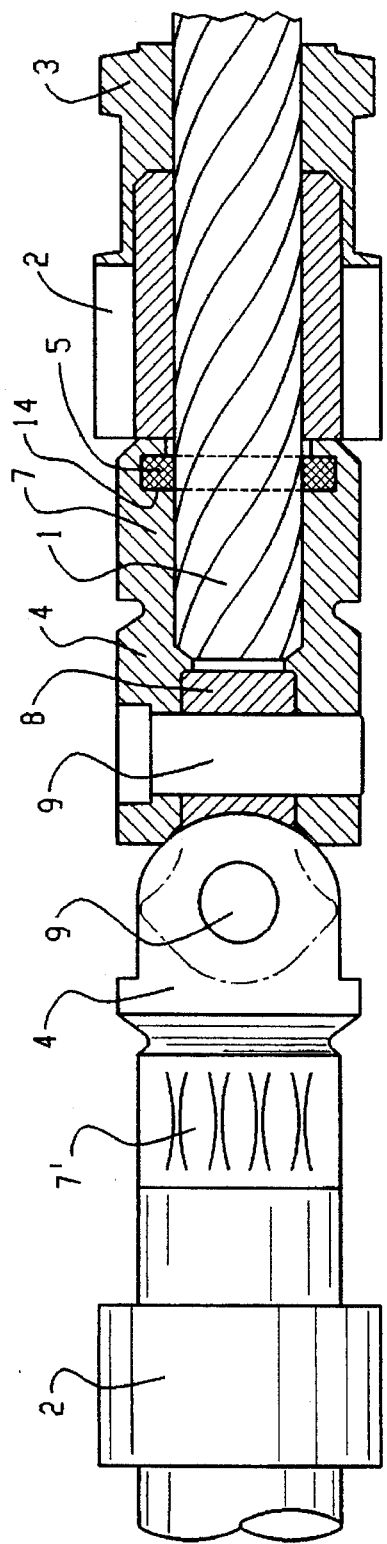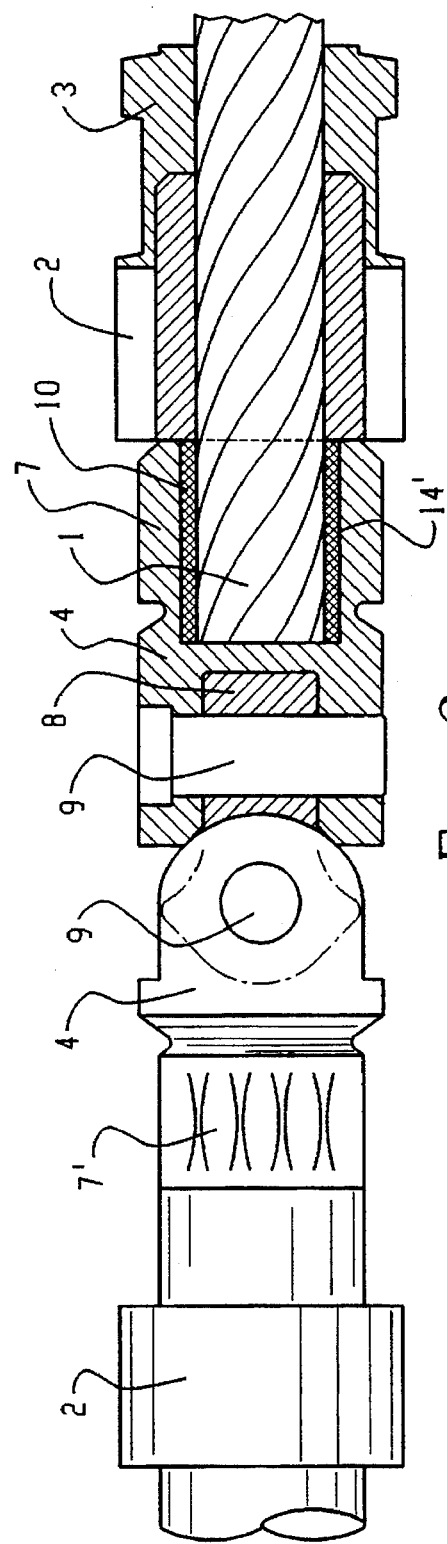

WIRE CONNECTING DEVICE FOR DIAMOND WIRE SAWS

TECHNICAL FIELD

The invention relates to a cutting wire for cutting natural stone, masonry, concrete and the like consisting of a main or carrier wire made of several intertwined wire strands, cutting beads, and at least one wire connector for connecting, once or repeatedly, the ends of the wire to form a closed cutting wire loop. The cutting beads preferably contain metal-bonded superabrasives and are, at certain distances, mounted on the wire. Each of the wire connectors consists of a left-sided and a right-sided clamping sleeve and at least one connection part enclosing and connecting the clamping sleeves. Alternatively, a single clamping sleeve enclosing the two wire ends can be used. Furthermore, the invention relates to a method of manufacturing the connecting device for such a cutting wire, whereby the clamping sleeve is clamped on to the end of the wire.

BACKGROUND

In addition to connecting the cutting wire to form a closed, rotating wire loop for operation in a wire sawing machine, the cutting wire connector serves the purpose of connecting several lengths of cutting wire, as is, for instance, necessary for repairing a broken cutting wire. Particularly, when machining concrete, as is necessary for removing parts of buildings with mobile wire sawing machines, for machining natural stone, and for creating internal contours with stationary wire sawing machines, it is essential to open and close the wire loop quickly, repeatedly, and without any problems, even when no repair work or length adaptations are necessary.

Equally, repeatedly setting, changing, and fixing the turning or twisting angle of the cutting wire along its longitudinal axis, which is made necessary by the normal wear progression of the abrasive coat of the cutting beads, wear that is frequently irregular and not concentric, requires a method of opening and closing the cutting wire connector as fast as possible and without any problems.

The following basic types of wire connectors are available for accomplishing this task: (i) screw-type connectors; (ii) clamping connectors; and (iii) joint connectors.

Clamping the connector parts to the main wire of the cutting wire is a state-of-the-art method for all three main types of connectors. For screw-type and joint connectors the left-handed and right-handed end piece of the connector are clamped to the respective wire end. Opening or closing the wire ends prepared in such a way is carried out by means of a threaded sleeve or an intermediate joint part, respectively.

On plain clamping connectors an undivided sleeve or clamping sleeve is clamped on to the left and right end of the main wire.

While state-of-the-art connections of the ends of cutting wires, namely screw-type, clamping, and joint connectors, offer the advantage of fast and problem-free connection, frequently used in combination with special tools and devices, nevertheless they exhibit in part considerable disadvantages as well. Particularly with screw-type and clamping connectors the wire frequently breaks in the proximity of the entry area of the main wire into the end sleeve or the clamping zone. It is true that the introduction of joint connectors has considerably prolonged the life of cutting wire connectors. However, a further increase in the service life is desirable, especially in connection with mobile wire sawing machines with an increased number of pulleys and a reduced nominal diameter of those pulleys.

SUMMARY OF THE INVENTION

One objective of the present invention is to improve the life of cutting wire connectors that are not based on the principle of splicing but use clamping sleeves. This is done by preventing the main wire from breaking in the proximity of the connector as well as by providing a new manufacturing method for such cutting wire connectors.

This task is accomplished in the following way: On the end that is remote from the separation area of the cutting wire loop, the clamping sleeve has a recess between the main wire and the clamping zone of the clamping sleeve into which a preferably annular elastic mass has been introduced, with the residual space of the recess being filled as a consequence of the common deformation of clamping zone and elastic mass under permanent compressive stress from all sides within the elastic mass.

The respective manufacturing process is characterized by the fact that the annular elastic mass is introduced into the recess before the clamping zone is clamped on to the main wire and that the elastic mass receives a part of the clamping deformation during the subsequent clamping of a clamping sleeve on the end of the main wire.

The principle of the invention relates to both the introduction of prefabricated, preferably annular elastic masses and the introduction of such masses that can harden or set before the clamping process is executed. In one embodiment of the invention the elastic mass is a conventionally available O-ring.

In a further embodiment of the invention the elastic mass is, for example, a rubber-based mass which can, through pouring, injection moulding or similar well-known methods, be produced in the recess and which can harden or set. The principle of the invention is characterized by the fact that clamping together the clamping part of the connector and the elastic mass generates a sufficiently high uniform compressive stress within the elastic mass on all sides. For this reason, masses with higher strengths can be used, which make possible both a high degree of vibration dampening in the area of the main wire close to the connector and permanent sealing against cutting fluid.

A design detail in this respect is the partial lateral barrier of the recess against adjacent components of the cutting wire formed by means of a radial web, which forms a barrier for the elastic mass, partially keeps it from escaping in the course of the clamping process, and leads to uniform pressure buildup in the recess. In one embodiment of the invention the dimensioning of the recess for receiving the elastic mass essentially corresponds to the entire width of the clamping zone.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

BRIEF DESCRIPTION OF DRAWINGS

In the following passages, embodiments of cutting wire connectors according to the invention will be illustrated by means of the following annexed detailed drawings:

FIG. 1 is a side view of a joint connector for cutting wires with the annular elastic mass according to the invention in a narrow design before clamping wherein specific portions of the joint connector have been sectioned;

FIG. 2 is a side view of a joint connector for cutting wires with the annular elastic mass according to the invention in a wide design before clamping wherein specific portions of the joint connector have been sectioned;

DETAILED DESCRIPTION OF PREFERRED EMBODIMENTS

Figure 3:
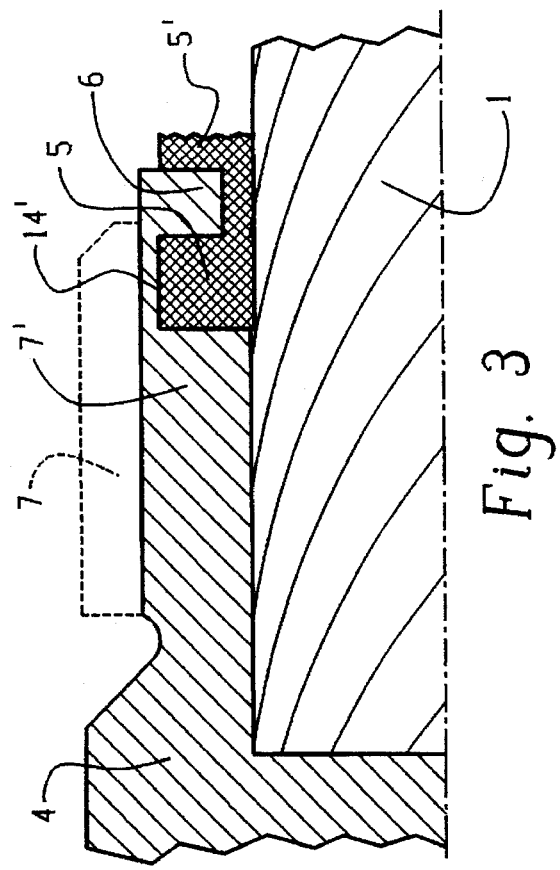
FIG. 3 shows the details of a clamping zone of a cutting wire connector according to the invention after clamping.

FIG. 1 shows a cutting wire connector according to the joint principle, with this kind of design having considerably higher mobility in all directions in comparison with clamping connectors or threaded connectors. As a consequence, a longer life of the cutting wire and higher fatigue strength under reversed bending stress are achieved. The advantage in comparison to rigid connection sleeves can be attributed to the fact that less reversed bending stress is transmitted on to the main wire (1) in the proximity of the clamping sleeve. The connector of FIG. 1 includes a cutting bead (2), a spacer sleeve (3), a clamping sleeve (4), an intermediate joint part (8), and a joint pin (9). The same reference numerals are used in FIGS. 2–6 to designate similar elements.

FIG. 1 also shows a joint connector for cutting wires improved according to the invention in comparison with the state of the art connectors through the use of a vibration-dampening mass (5), preferably in annular shape, before the clamping sleeve (4) is clamped on to the end of the main wire (1). In this embodiment of the invention the ring (5) preferably is a conventional O-ring, as is used for sealing purposes in machine construction.

However, the principle of the invention extends to further shapes and compositions of elastic mass (5) without all of these possible shapes being illustrated. Equally, the principle of the invention relates to the use of several partial masses arranged next to each other when they do not have an annular shape. One embodiment of the design of the elastic mass according to the invention is shown in FIG. 2, reference number (10), in a state where clamping has not taken place yet and where the width of this annular design essentially corresponds to the entire seat length of the main wire (1) in the recess of the clamping sleeve (4).

It will be appreciated that elastic mass (5) may comprise any one of a variety of polymeric materials. Such polymeric materials include elastomers such as butadiene-type rubbers including copolymers of styrene and butadiene, polyisoprene or natural rubbers, butyl rubber or polyisobutylene, nitrile rubbers or neoprene (polychloroprene); thermosetting polymers such as phenolics like phenol-formaldehyde, and amino resins such as ureaformaldehyde, melamine-formaldehyde, and crosslinkable polyesters and epoxy resins; heterochain thermoplastics like polyamides such as Nylon 6, Nylon 6,6, Nylon 11, Nylon 12, polyethylene terephthalate, polyoxymethylene, polycarbonate, polydimethylsiloxane (silicone); olefinic thermoplastics such as polyethylene and polypropylene; vinyl halide polymers such as poly(vinylchloride) (PVC); fluorinated polymers such as polytetrafluoro-ethylene; styrenic polymers such as polystyrene and high-impact polystyrene (HIPS); acrylic polymers such as polyacrylonitrile and polymethyl methacrylate; and copolymers of various types such as acrylic-butadiene-styrene (ABS) copolymers and ethylene vinyl acetate (EVA) copolymers.

According to the process of the invention, referring to FIG. 2 clamping of a joint connector is carried out after the annular elastic mass (10) and the end of the main wire (1) have been joined with the clamping sleeve (4). In the course of this process, both the clamping zone (7) of the clamping sleeve (4) and the elastic mass (10) are introduced between the end of the main wire (1) and then the clamping zone (7) is deformed by means of well-known devices and/or tools. Similarly, as to the clamp connector of FIG. 5, clamping is carried out after the annular elastic mass (5) and the end of the main wire (1) have been joined with the clamping sleeve (11). The clamping zone (7) of the clamping sleeve (11) and the elastic mass (5) are introduced between the end of the main wire (1) and then deformed by known means. Similarly, as to the screw connector of FIG. 6, clamping is carried out after the elastic masses (5 and 5') and the respective ends of the main wire (1 and 1') have been joined with the clamping sleeves (12 and 13). The clamping zones (7 and 7') of the sleeves (12 and 13) and the respective elastic masses (5 and 5') are introduced between the respective ends of the main wire (1 and 1') and the clamping zones are then deformed by conventional means.

It will be appreciated that the elastic mass can be separately produced or it can be introduced in a flowable form through, for example, pouring, injection moulding or similar well-known methods, and thus produced in the recess in-situ through hardening or setting.

As is illustrated in FIG. 3, during the clamping process a lateral web (6) hinders but does not completely prevent the elastic mass (5) from escaping so that excess elastic mass (5') can fill out interstices between the clamping sleeve (4) and the cutting bead or spacer sleeve located axially adjacent on the main wire. Due to the clamping process, the elastic mass (5) of FIGS. 1, 4, 5 and 6 and elastic mass (10) of FIG. 2 is put under a high, permanently elastic pressure which is exerted uniformly in all spatial directions.

As is shown in FIG. 2, during the clamping process of the clamping zone (7) of a clamping sleeve (4), the lateral barriers for the elastic mass (10) are formed by the pocket hole on the one hand and by the first adjacent cutting bead (2) or the first adjacent spacer sleeve (3) on the other. Thereby, the difference in the diameter of the metal between the main wire (1) and bore diameter of the clamping zone (7) of the clamping sleeve (4) is, dependent on the shape of a conventionally available clamping tool, reduced in certain areas to meet the clamping dimensions.

Figure 4:
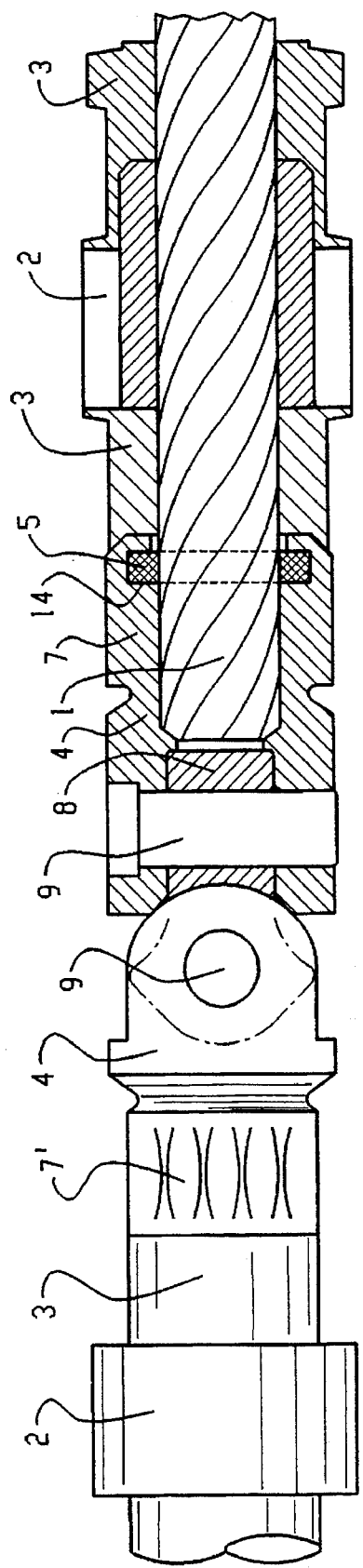
FIG. 4 is a side view of a joint connector for cutting wires with the annular elastic mass according to the invention and a spacer sleeve between the clamping sleeve and the first cutting bead wherein specific portions of the joint connector have been sectioned.
Figure 5:
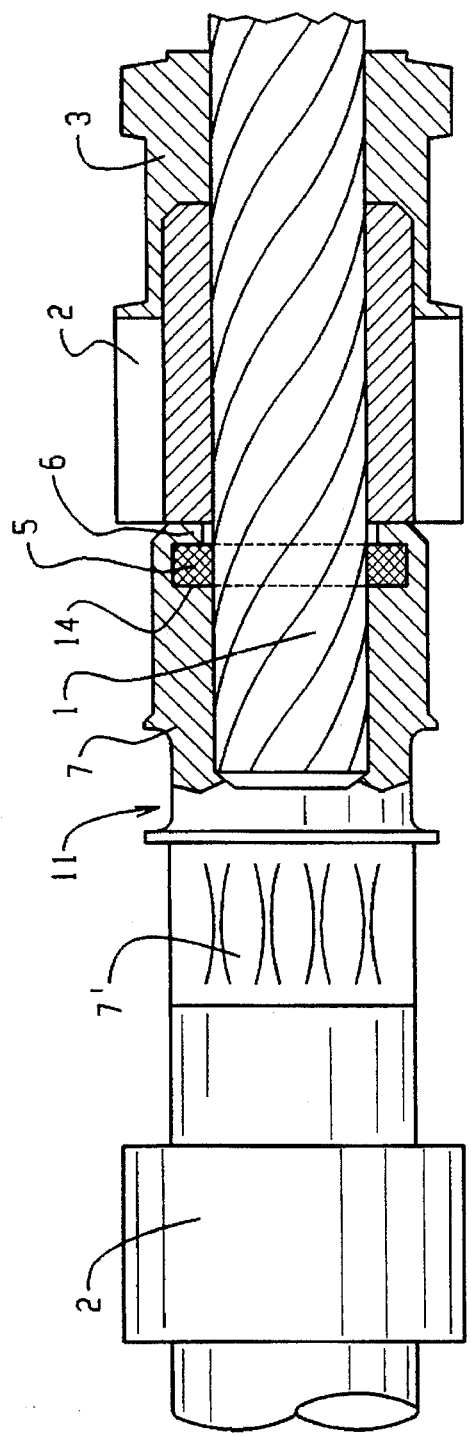
FIG. 5 is a side view of a clamping connector for cutting wires with the annular elastic mass according to the invention before clamping wherein specific portions of the joint connector have been sectioned.
Figure 6:
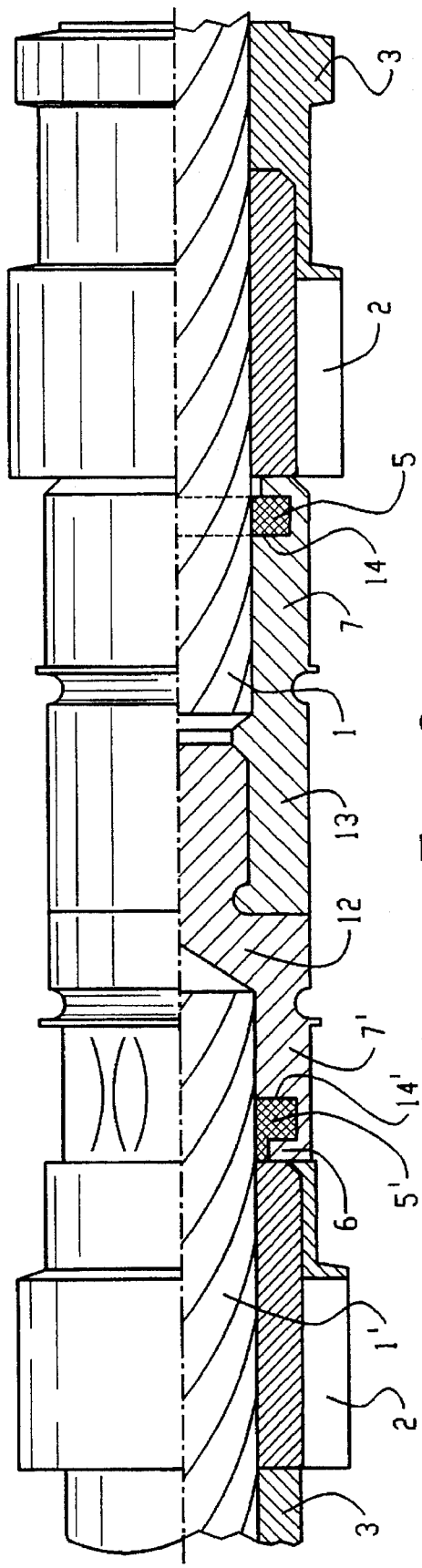
FIG. 6 is a side view of a screw-type connector for cutting wires with the annular elastic mass according to the invention before clamping wherein specific portions of the joint connector have been sectioned.

In tests with cutting wire connectors according to the invention using clamping sleeves (4) of FIGS. 1, 2 and 4, sleeve (11) of FIG. 5 and sleeves (12 and 13) of FIG. 6, a considerable increase in the life of the connectors could always be ascertained, independent of the basic construction design of the cutting wire connector. The life of the connectors was especially improved for screw-type connectors and plain clamping connectors. According to the state of the art, plain clamping connectors, as illustrated in FIG. 5, are used mainly for repair work.

For wire cutting connectors constructed according to the state of the art that have no joint and are based on clamping sleeves, much-feared wire breaks in the area of the main wire next to the clamping sleeve represent a significant problem for wire sawing technology. It could be ascertained that high-frequency vibrations between the sleeve material and the main wire area in the proximity of the sleeves are responsible for these breaks. The problem with the life of all designs of cutting wire connectors that employ clamping sleeves can be improved significantly by means of the invention described herein.

FIGS. 1, 2 and 4 show joint connectors with the annular elastic mass (5) of FIGS. 1 and 4, and the elastic mass (10) of FIG. 2 according to the invention, whereby the right halves of the respective drawings are sectional views before the clamping process and the left halves of the drawings are non-sectional views after clamping has been carried out.

FIG. 3 schematically shows the contours of a clamping zone (7') of a clamping sleeve after clamping has taken place, whereby the annular elastic mass (5) completely fills the recess (14') after clamping and excess elastic mass (5') has escaped laterally.

According to the state of the art, cutting beads (2) are arranged in the axial direction of the wire (1) directly adjacent to the clamping sleeves of cutting wire connectors in order to shorten the design length of the latter, as is illustrated in FIGS. 1, 2, 5, and 6. Alternatively, the first spacer sleeve (3) is used between clamping sleeve and cutting bead, as is shown in FIG. 4. The vibration-dampening effect of the elastic mass (5) of FIGS. 1, 4 and 5 and elastic mass (10) of FIG. 2 in cutting wire connectors according to the invention and its influence on improving the life of the wire occurred independently of the arrangement and distance of the closest cutting bead (2) on the main wire (1).

FIG. 5 shows a clamping connector (11) with annular elastic mass (5) according to the invention on each of the ends of the main wire ends (1) to be connected. This construction design of a cutting wire connector is preferably used for the repair or one-time extension of cutting wires.

FIG. 6 shows a screw-type connector for the wire ends (1) and (1') to be connected, consisting of clamping sleeve (12) with the male thread, clamping sleeve (13) with the female thread, and recesses (14) and (14') with annular elastic masses (5) and (5') introduced in the respective clamping parts (7) and (7').

While the invention has been explained in relation to its preferred embodiments, it is to be understood that various modifications thereof will become apparent to those skilled in the art upon reading this specification. Therefore, it is to be understood that the invention disclosed herein is intended to cover such modifications as fall within the scope of the following claims.

What is claimed:

1. A wire saw used for cutting natural stone, masonry and concrete comprising a main wire made of several intertwined wire strands and cutting beads, said cutting beads being spaced at certain distances on the main wire, and at least one wire connector for connecting the ends of said main wire to form a closed cutting wire loop, said wire connector comprising at least one clamping sleeve having a clamping zone, said clamping sleeve including a recess and an elastic mass situated in said recess between the main wire and the clamping zone of said clamping sleeve, said elastic mass being under permanent, uniform compressive stress generated by the clamping together of said clamping zone and said elastic mass with said main wire.

2. A wire saw as set forth in claim 1 wherein said elastic mass comprises a material selected from the group consisting of an elastomer, a thermosetting polymer, a heterochain thermoplastic, an olefinic thermoplastic, a vinyl halide polymer, a fluorinated polymer, a styrenic polymer, an acrylic polymer and a copolymer material.

3. A wire saw as set forth in claim 2 wherein said recess includes a border and said clamping zone includes a lateral web that forms said border of said recess.

4. A wire saw as set forth in claim 3 wherein a portion of said elastic mass is disposed between said lateral web and one of said cutting beads.

5. A wire saw as set forth in claim 3 further including at least one spacer disposed along said main wire, and a portion of said elastic mass is disposed between said lateral web and one of said spacers.

6. A wire saw as set forth in claim 1 wherein said recess includes a border and said clamping zone includes a lateral web that forms said border of said recess.

7. A wire saw as set forth in claim 6 wherein a portion of said elastic mass is disposed between said lateral web and one of said cutting beads.

8. A wire saw as set forth in claim 6 further including at least one spacer disposed along said main wire, and a portion of said elastic mass is disposed between said lateral web and one of said spacers.

* * * * *